United States Patent Office 3,558,638
Patented Jan. 26, 1971

3,558,638
3-CYANO-1,2,3,4,5,6-HEXAHYDRO-2,6-METHANO-3-BENZAZOCINES
Frank H. Clarke, Jr., Armonk, and Fred B. Block, Hartsdale, N.Y., assignors to Geigy Chemical Corporation, Ardsley, N.Y., a corporation of New York
No Drawing. Continuation-in-part of applications Ser. No. 635,291, Apr. 10, 1967, and Ser. No. 661,528, Aug. 18, 1967, the latter being a continuation-in-part of application Ser. No. 465,143, June 18, 1965, now Patent No. 3,341,538, which in turn is a continuation-in-part of application Ser. No. 332,296, Dec. 20, 1963. This application Oct. 3, 1968, Ser. No. 764,968
Int. Cl. C07d *39/00*
U.S. Cl. 260—294.3
17 Claims

ABSTRACT OF THE DISCLOSURE

3 - cyano - 1,2,3,4,5,6 - hexahydro - 2,6 - methano-3 - benzazocine derivatives which are analgesics and chemical intermediates are prepared via treatment of a 3-methyl-1,2,3,4,5,6-hexahydro-2,6-methano - 3 - benzazocine with cyanogen bromide. Urea derivatives obtained from these intermediates can be used in analgesic compositions.

CROSS REFERENCE

This is a continuation-in-part of copending application Ser. No. 635,291 filed Apr. 10, 1967 now abandoned, and of Ser. No. 661,528 filed Aug. 18, 1967 now abandoned, Ser. No. 661,528 being a continuation-in-part of Ser. No. 465,143 filed June 18, 1965, now U.S. Pat. No. 3,341,538, which in turn is a continuation-in-part of then-copending application Ser. No. 332,296 filed Dec. 20, 1963, now abandoned.

DETAILED DESCRIPTION

This invention relates to novel organic compounds, to novel methods for the use of such compounds, to novel processes for their preparation, to novel intermediates employed in these processes and to novel compositions and uses utilizing derivatives obtained from these intermediates.

In particular, the present invention pertains to the class of 3-cyano-2,6-methano-3-benzazocines represented by the formula:

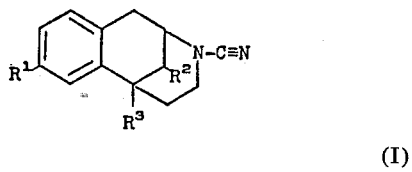

(I)

wherein $R^1$ is hydrogen, hydroxy, (lower)alkoxy or (lower)alkanoyloxy,
$R^2$ is hydrogen or (lower)alkyl,
$R^3$ is hydroxy (lower) alkyl, β-methoxyethyl, or

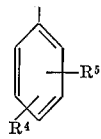

in which each of $R^4$ and $R^5$ indepentent of the other is hydrogen, halogen (lower) alkyl, (lower)alkoxy (lower)alkanoyloxy, hydroxy or trifluoromethyl.

The compounds of this invention are non-toxic analgesics, having an activity of the same order as codeine, and antitussives. The biologically active compounds of this invention may exist in isomeric forms and may be administered alone or in combination with acceptable pharmaceutical carriers, the choice of which is determined by the intended route of administration, the solubility of the compound and standard pharmaceutical practice. In general, the dosages of these compounds are of approximately the same order of magnitude as those of codeine, and these compounds are useful to treat the types of conditions often treated with codeine.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures. For oral administration the compounds can be administered in the form of tablets containing excipients such as starch or milk sugar. Aqueous suspensions and elixirs which may be sweetened or flavored may also be used. For intra-articular injection, aqueous suspensions can be employed. Various suspending and wetting agents may be added to the compositions to obtain a suspension not tending to settle out easily or to pack down in the bottle in which it is stored. Intramuscular and subcutaneous dosage forms are also prepared by standard pharmaceutical practice.

By the term "(lower)alkyl" and derivations thereof such as "(lower)alkoxy," "(lower)alkanoyloxy" and the like is intended a group comprising a branched or straight hydrocarbon chain containing from one to six carbon atoms. Representative of (lower)alkyl groups are thus methyl, ethyl, propyl, isopropyl, butyl, s-butyl, t-butyl, pentyl, isopentyl, hexyl and the like. Embraced by (lower)alkoxy are groups containing from one to six carbon atoms and joined through an oxygen ether bond, such as methoxy, ethoxy, isopropoxy, butoxy and the like. It is to be understood that when the nature of any particular functional group in these moieties requires two carbon atoms, the hydrocarbon portion of the designated moiety will have from two to seven carbon atoms.

With greater particularity to Formula I, the benzo portion of the fundamental nuclei of these benzazocines is either unsubstituted, or substituted in the 8-position by the hydroxy group or a derivative thereof such as an ether or ester; i.e., $R^1$ is (lower)alkoxy or (lower)alkanoyloxy respectively.

The benzazocines of the present invention are either unsubstituted in the 6-position or substituted by (a) a (lower)alkyl group such as the 6-isopropyl-2,6-methano-3-benzazocines, 6-methyl-2,6-methano-3-benzazocines and the like; (b) the β-methoxyethyl group; or (c) a phenyl group, including substituted phenyl groups. 6-phenyl-2,6-methano-3-benzazocines, alternatively named as 5-phenylbenzomorphans, are described and claimed by Frank H. Clarke, Jr., U.S. Pat. No. 3,320,265, issued May 16, 1967. Typical of such 6-phenyl-2,6-methano-3-benzazocines are those of the formula:

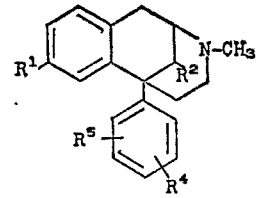

(II)

in which each of $R_4$ and $R_5$ is hydrogen, halogen, (lower) alkyl, (lower)alkoxy, (lower)alkanoyloxy, hydroxy or trifluoromethyl,
$R^1$ is hydrogen, hydroxy, (lower)alkoxy or (lower)alkanoyloxy and
$R^2$ is hydrogen or (lower)alkyl.

The following compounds are representative of the 6-phenyl-2,6-methano-3-benzazocines of Formula II without limiting the same:

1,2,3,4,5,6 - hexahydro - 3 - methyl - 6 - phenyl - 2,6-methano-3-benzazocine-8-ol, 6 - (4' - chlorophenyl) - 1,2,3,4,5,6 - hexahydro - 2,6-methano-3-benzazocine-8-ol, 8 - acetoxyl - 1,2,3,4,5,6 - hexahydro - 3 - methyl - 6-phenyl-2,6-methano-3-benzazocine, 8 - methoxy - 1,2,3,4,5,6 - hexahydro - 3 - methyl - 6-phenyl-2,6-methano-3-benzazocine, 1,2,3,4,5,6 - hexahydro - 8 - methoxy - 6 - (4' - methoxyphenyl)-2,6-methano-3-benzazocine, 1,2,3,4,5,6 - hexahydro - 6 - (4' - hydroxyphenyl) - 3-methyl-2,6-methano-3-benzazocine-8-ol, 6 - (3',4' - dimethoxyphenyl) - 1,2,3,4,5,6 - hexahydro-8-methoxy-3-methyl-2,6-methano-3-benzazocine, 1, 2, 3, 4, 5, 6 - hexahydro - 8 - methoxy - 3 - methyl - 6-(3'-trifluoromethylphenyl)-2,6 - methano - 3 - benzazocine and 1,2,3,4,5,6 - hexahydro - 3 - methyl - 6 - (4' - methylphenyl)-2,6-methano-3-benzazocine-8-ol.

The preparation of such 2,6-methano-3-benzazocines which serve as intermediates for the synthesis of corresponding compounds of the present invention, is more fully described in U.S. Pat. No. 3,320,265.

The 2,6-methano-3-benzazocines of the present invention are either unsubstituted in the 11-position ($R^2$) or substituted by a (lower)alkyl group. When so substituted and when additionally substituted in the 6-position, stereoisomerism is also possible giving rise to cis and trans forms. Both such forms are envisioned as being within the scope of the present invention.

The compounds of the present invention are prepared by treatment of a 3-methyl-2,6-methano-3-benzazocine of Formula III with an excess of cyanogen bromide. Generally the reaction is conducted in an inert organic solvent such as chlorinated hydrocarbon, e.g., methylene chloride, chloroform, or the like at slightly elevated temperatures, advantageously the reflux temperature of the reaction mixture. The product is readily isolated by evaporation of the solvent and excess reagent and, depending upon the intended use, may be further purified via conventional techniques such as recrystallization, chromatography or the like. The transformation effected by this reaction may be diagrammatically represented as follows:

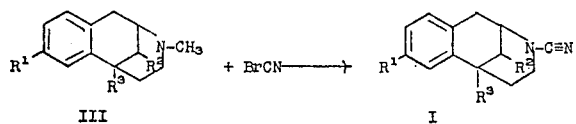

In the foregoing $R^1$, $R^2$ and $R^3$ are as previously defined. In practice, a free hydroxy group is advantageously protected as for example through esterification, e.g., formation of an acetate, or etherification, e.g., formation of the methoxy derivative. These groups may be cleaved by conventional techniques to regenerate the free hydroxy group.

In addition to their pharmacological properties, the compounds of the present invention are also useful intermediates. Thus by reduction of these 3-cyano-2,6-methano-3-benzazocines as with lithium aluminum hydride there is obtained the corresponding 3-unsubstituted 2,6-methano-3-benzazocine which can be converted to a wide variety of 3-substituted derivatives, such as those of U.S. Pat. No. 3,320,265 via alkylation. In addition the 3-cyano derivatives of the present invention may be treated with hydrogen peroxide in base or hydrolysed under acidic conditions to yield the 3-carbamyl derivatives of U.S. Pat. No. 3,341,538, referred to above.

The following examples will serve to further typify the nature of the present invention through the presentation of representative embodiments. Being merely representative however, these examples should not be construed as a limitation thereof.

EXAMPLE 1

8-acetoxy-3-cyano-1,2,3,4,5,6-hexahydro-6-phenyl-2,6-methano-3-benzazocine (a) 1 - methyl - 4 - phenyl - 1,2,5,6 - tetrahydropyridine.—An ethereal solution of 76.5 g. (0.675 mole) of redistilled 1-methyl-4-piperidone is added with stirring over 45 minutes to an ice-cooled benzene-ethereal solution containing 0.74 mole of phenyl lithium. The reaction mixture is maintained below 10° during addition and then allowed to attain room temperature with stirring continued for two hours after addition is complete. At the end of this time, the mixure is poured ino 500 ml. of ice water with stirring. Chloroform is added and the mixture heated gently until all solid is dissolved. The organic layer is separated, dried over sodium sulfate and evaporated to an oil. While this oil may be allowed to solidify to yield 1-methyl-4-phenyl-4-hydroxypiperidine, M.P. 107–110° C. after trituration with pentane, it may be employed directly in the next step without further purification. Thus the oil is dissolved in 215 ml. of conc. hydrochloric acid and this acidic solution is heated at reflux temperature for two hours with stirring to prevent superheating. At the end of this time, the solution is cooled and poured into an ice cold aqueous solution of 170 g. of sodium hydroxide. This reaction mixture is then extracted with chloroform and the extracts dried over sodium sulfate. After removing the solvents by evaporation, the oil which is obtained is distilled in vacuo to yield the intermediate product 1-methyl-4-phenyl-1,2,5,6-tetrahydropyridine, B.P. 103–114° C./0.9 mm.

Alternatively this product may be obtained by use of phenyl magnesium bromide in place of phenyl lithium.

(b) 1 - methyl-1-(4-methoxybenzyl)-4-phenyl-1,2,5,6-tetrahydropyridinium chloride.—Ninety grams (.58 mole) of p-methoxybenzyl chloride in 50 ml. of acetone are added in a dropwise fashion to a stirred solution of 78 g. (.45 mole) of 1-methyl-4-phenyl-1,2,5,6-tetrahydropyridine in 350 ml. of acetone at reflux. The mixture is heated at reflux with stirring for two hours, at the end of which time the solid which has formed is collected from the cooled solution. This solid is washed with acetone and thoroughly dried in vacuo to yield the quaternary salt with apparently variable melting points, e.g., 119–126°, 123–126° and 167–170° C. for three separate preparations. All such material however can be employed in the following procedure without adverse effect on yield or purity.

The requisite p-methoxybenzylchloride is obtained by treating a benzene solution of anisyl alcohol with anhydrous hydrogen chloride with cooling until the solution is saturated. After stirring for two hours, the aqueous layer stirred for one hour with anhydrous sodium sulfate. The drying agent is then removed by filtration and the solvent and hydrogen chloride are removed by flash evaporation. The product can be used in the above procedure without further purification.

(c) 1 - methyl-2-(4-methoxybenzyl)-4-phenyl-1,2,5,6-tetrahydropyridine.—An ethereal suspension of 165 g. (1.05 mole) of the quaternary salt obtained in part (b) of this example is treated under nitrogen with 635 ml. (.98 mole) of a 1.56 N ethereal solution of butyllithium. The butyllithium is added slowly over a period of one hour, the reaction mixture being stirred during the addition. At the end of this time, the reaction mixture is refluxed for two hours, cooled and poured into one liter of cold water. The ethereal layer is separated and extracted with a solution of 100 ml. of conc. hydrochloric acid in one liter of water. The aqueous extracts together with the oily precipitate are then rendered alkaline by the addition of 200 ml. of conc. aqueous ammonia. The precipitated base is taken up in ether and the solution thus obtained dried over sodium sulfate. The drying agent is removed by filtration and the solvent by evaporation to yield 1-methyl-2 - (4 - methoxybenzyl) - 4 - phenyl - 1,2,5,6-tetrahydropyridine which is further purified by distillation at 135–225° C./2 mm.

The distillate is converted to the hydrobromide by the cautious addition of anhydrous hydrogen bromide to a cold acetone solution of the base. Collection of the solid thus formed and recrystallization yields the hydrobromide salt, M.P. 170–172° C.

In a similar fashion the hydrochloride salt is obtained by employing anhydrous hydrogen chloride in place of hydrogen bromide. This salt has a melting point of 119–124° C.

Alternatively 1-methyl-2-(4-methoxyphenyl)-4-phenyl-1,2,5,6-tetrahydropyridine is obtained in the following manner. A mixture of 33 g. of the quaternary salt obtained in part (b) of this example and 6.0 g. of powdered potassium hydroxide is stirred at reflux with 300 ml. of benzene for two hours. The solids are then removed by filtration and the filtrate is acidified with an ethereal solution of anhydrous hydrogen bromide. The hydrobromide salt thus obtained is recrystallized from ethanol-ether to give colorless crystals, melting point as above.

Alternatively acetone may be used in place of benzene in the above example. After 30 minutes of stirring at reflux, the solution is acidified with anhydrous hydrogen chloride, filtered to remove inorganic compounds, and evaporated to dryness in vacuo. The residue is triturated with ether to remove polymers of acetone and again evaporated to dryness. The residue may be cyclized directly using 48% hydrobromic acid as described in part (d) of this example below.

(d) 1,2,3,4,5,6 - hexahydro - 3 - methyl-6-phenyl-2,6-methano-3-benzazocine-8-ol.—A solution of 32.7 g. of 1-methyl - 2 - (4-methoxybenzyl)-4-phenyl-1,2,5,6-tetrahydropyridine hydrobromide in 330 ml. of 48% hydrobromic acid is refluxed for four and one-half hours. At the end of this time, the reaction mixture is cooled and poured into a cold solution of 330 ml. of conc. aqueous ammonia and an equal volume of ice. The solid which forms is collected by filtration and dried to constant weight to yield 1,2,3,4,5,6-hexahydro-3-methyl-6-phenyl-2,6-methano-3-benzazocine-8-ol, M.P. 220° C. Recrystallization of this material from methanol raises the melting point to 249–252° C.

Calc'd for $C_{19}H_{21}NO$ (279.39) (percent): C, 81.69; H, 7.58; N, 5.01. Found (percent): C, 81.43; H, 7.69; N, 4.71.

The reflux period of this procedure may be increased to as much as 24 hours without appreciable effect on the yield.

(e) 8 - acetoxy - 1,2,3,4,5,6 - hexahydro - 3 - methyl 6-phenyl-2,6-methano-3-benzazocine.—A mixture of 1.68 g. of 1,2,3,4,5,6 - hexahydro - 3 - methyl - 6-phenyl-2,6-methano-3-benzazocine-8-ol and 8.4 ml. of acetic anhydride is heated at 100° C. for 45 minutes. The solution is then poured into 20 ml. of cold water and after five minutes, an aqueous solution of 50% potassium hydroxide is added in slight excess with cooling. The liberated base is shaken quickly into ether. Drying and evaporation of the ethereal solution, followed by recrystallization from isopropyl ether affords 8-acetoxy-1,2,3,4,5,6-hexahydro - 3 - methyl - 6-phenyl-2,6-methano-3-benzazocine, M.P. 120–122° C.

Calc'd. for $C_{21}H_{23}NO_2$ (321.40) (percent): C, 78.47; H, 7.21; N, 4.36. Found (percent): C, 78.18; H, 7.25; N, 4.54.

The free base may be converted to the hydrochloride by dissolving in a minimum volume of absolute ethanol and treating the solution with ethanolic hydrogen chloride until acidic to congo red indicator. The solution is then diluted with 5 volumes of anhydrous ether and allowed to crystallize. There is thus obtained 8-acetoxy-1,2,3,4,5,6-hexahydro-3-methyl-6-phenyl-2,6-methano-3-benzazocine hydrochloride as the monohydrate, partial melt at 180–190° C. with a clear melt at 250–253° C.

In a similar fashion by employing acylating derivatives of other (lower)alkanoic acids the corresponding 8-alkanoyloxy compounds can be obtained. For example, by use of propionic anhydride in the above procedure, there is obtained 1,2,3,4,5,6-hexahydro-3-methyl-6-phenyl-8-propionyloxy-2,6-methano-3-benzazocine.

(f) 8-acetoxy-3-cyano-1,2,3,4,5,6-hexahydro-6-phenyl-2,6-methano-3-benzazocine.—To a solution of 2.6 g. of cyanogen bromide in 30 ml. of chloroform is added at room temperature a solution of 6.5 g. of 8-acetoxy-1,2,3,4,5,6-hexahydro - 3 - methyl-6-phenyl-2,6-methano-3-benzazocine in 30 ml. of chloroform over a period of 45 minutes. The solution is refluxed for three hours and then evaporated to dryness in vacuo. The residue is crystallized from ethanol to yield 8-acetoxy-3-cyano-1,2,3,4,5,6-hexahydro-6-phenyl - 2,6 - methano-3-benzazocine, M.P. 207–209° C.

Calc'd for $C_{21}H_{20}N_2O_2$ (332.39) (percent): C, 75.88; H, 6.07; N, 8.43. Found (percent): C, 75.62; H, 6.04; N, 8.46.

Likewise there is produced 3-cyano-1,2,3,4,5,6-hexahydro-6-phenyl-8-propionyloxy-2,6-methano-3-benzazocine.

EXAMPLE 2

3-cyano-1,2,3,4,5,6-hexahydro-6-phenyl-2,6-methano-3-benzazocine-8-ol

A mixture of 3 g. of 8-acetoxy-3-cyano-6-phenyl-1,2,3,4,5,6-hexahydro-2,6-methano-3-benzazocine in 100 ml. of ethanol and 10 ml. of 1 N sodium hydroxide solution is refluxed for 4 hours. The cooled mixture is acidified and concentrated to half volume. The solid is collected, dried and recrystallized from ethanol to yield the desired free alcohol, M.P. 232–234° C.

EXAMPLE 3

3-cyano-1,2,3,4,5,6-hexahydro-8-methoxy-6-phenyl-2,6-methano-3-benzazocine (a) 1,2,3,4,5,6-hexahydro - 8 - methoxy-3-methyl-6-phenyl-2,6-methano-3-benzazocine.—To a solution of 17.2 g. of phenyltrimethyl ammonium chloride in 25 ml. of absolute methanol at 25° C. is added a solution of 2.25 g. of sodium in 25 ml. of absolute methanol. The sodium chloride formed is removed by filtration in the absence of moisture and carbon dioxide.

To this solution is added 25.0 g. of 1,2,3,4,5,6-hexahydro-3-methyl-6-phenyl-2,6-methano-3-benzazocine-8-ol in toluene. The mixture is then heated with stirring so as to permit removal of the solvents (100–110° C.). The reaction solution is then cooled, washed with cold, diluted aqueous sodium hydroxide solution and extracted with dilute aqueous hydrochloric acid. The acid extracts are rendered basic by the addition of aqueous ammonia. The solid which forms is dissolved in chloroform and the solution dried over sodium sulfate. Removal of the solvent then yields 1,2,3,4,5,6-hexahydro-8-methoxy-3-methyl-6-phenyl-2,6-methano-3-benzazocine.

Alternatively, a solution of 24 g. of aluminum tribromide in 100 ml. of carbon disulfide is slowly added with cooling to a stirred suspension of 8.0 g. of the hydrochloride salt of 2-(4-methoxybenzyl)-1-methyl-4-phenyl-1,2,5,6-tetrahydropyridine in 50 ml. of carbon disulfide. When addition is complete, the cooling bath is removed and the mixture stirred at reflux for half an hour. After cooling, the solvent is decanted and the viscous residue is added to a mixture of excess conc. aqueous ammonia, ice and chloroform. This mixture is stirred to decompose all of the aluminum tribromide complex and the chloroform layer is then separated and dried over sodium sulfate. After evaporating the solvent, the residue is triturated with ether, filtered and again evaporated to yield 1,2,3,4,5,6-hexahydro-8-methoxy-3-methyl 6-phenyl-2,6-methano-3-benzazocine.

(b) 3-cyano-1,2,3,4,5,6-hexahydro-8-methoxy-6-phenyl-2,6-methano-3-benzazocine.—To a solution of 2.6 g. of cyanogen bromide in 30 ml. of chloroform is added a solution of 6.5 g. of 1,2,3,4,5,6-hexahydro-8-methoxy-3-methyl-6-phenyl-2,6-methano-3-benzazocine in 100 ml. of chloroform over a period of 45 minutes. The resulting solution is refluxed for three hours and the solvent then evaporated to give 3-cyano1,2,3,4,5,6-hexahydro-8-methoxy-6-phenyl-2,6-methano-3-benzazocine. The product is further purified by recrystallization from acetone.

EXAMPLE 4

8-acetoxy-3-cyano-6-(p-chlorophenyl)1,2,3,4,5,6-hexahydro-2,6-methano-3-benzazocine (a) 1-methyl-4-(p-chlorophenyl) - 1,2,5,6 - tetrahydropyridine.—A mixture of 3.00 g. of 4-(p-chlorophenyl)-1,2,5,6-tetrahydropyridine hydrochloride, 2.36 g. of sodium acetate, 7.9 ml. of 37% formaldehyde solution and 3.62 g. of 91% formic acid is heated at steam bath temperature for two hours with stirring. The mixture is then cooled and poured into 50 ml. of an ice-water mixture. After rendering the solution strongly alkaline by the addition of concentrated aqueous ammonia, it is extracted with ethyl ether. The extracts are then washed with water and dried over sodium sulfate. Upon evaporation of the solvent, there is obtained 1-methyl-4-(p-chlorophenyl)-1,2,5,6-tetrahydropyridine, M.P. 90–91° C., which may be further purified by recrystallization from either isopropyl ether or petroleum ether.

(b) 1-methyl-1-(p-methoxybenzyl)-4-(p-chlorophenyl)-1,2,5,6-tetrahydropyridinium chloride.—To a solution of 9.66 g. of 1-methyl-4-(p-chlorophenyl)-1,2,5,6-tetrahydropyridine in 30 ml. of acetone is added 9.12 g. of p-methoxybenzyl chloride dissolved in 10 ml. of acetone. The solution is stirred at reflux for one-half an hour, cooled and filtered. The quaternary salt thus obtained demonstrates a melting point of 194–195.5° C.

(c) 1 - methyl - 2 - (p-methoxybenzyl)-4-(p-chlorophenyl) - 1,2,5,6-tetrahydropyridine hydrobromide.—To 3.30 g. of freshly dried (80°/.1 mm.) 1-methyl-1-(p-methoxybenzyl) - 4 - (p - chlorophenyl)-1,2,5,6-tetrahydropyridinium chloride slurried in 50 ml. anhydrous ether are added 5.50 ml. of 2.00 N phenyl lithium under dry nitrogen free of oxygen. The mixture is refluxed for two hours under nitrogen. The cooled mixture is then poured into 50 g. of ice-water and the resultant ether phase extracted three times with 50 ml. portions of 2 N hydrochloric acid. The oily hydrochloride phase so obtained is rendered basic by addition of concentrated aqueous ammonia and extracted with ethyl ether. The ethereal extracts are washed once with water, dried over magnesium sulfate with clarification and evaporated. The oil thus obtained is dissolved in acetone and treated with hydrogen bromide gas until acid to Congo red indicator. An equal volume of ether is added and the solution cooled. The solid thus formed is collected by filtration to yield 1-methyl - 2 - (p-methoxybenzyl) - 4 - (p-chlorophenyl)-1,2,5,6-tetrahydropyridine hydrobromide, M.P. 172–178° C. Upon further recrystallizations from 1:1:3 ethanol:acetone:ether, the material demonstrates a melting point of 181–182° C.

Calc'd for $C_{20}H_{22}ClNO \cdot HBr$ (percent): C, 58.76; H, 5.67; Br, 19.55. Found (percent): C, 58.81; H, 5.62; Br, 19.42, 19.68.

(d) 6 - (p - chlorophenyl) - 1,2,3,4,5,6 - hexahydro-3 - methyl - 2,6 - methano - 3 - benzazocine-8-ol.—A mixture of 8.72 g. of 1-methyl-2-(p-methoxybenzyl)-4-(p-chlorophenyl) - 1,2,5,6-tetrahydropyridine hydrobromide and 131 ml. of 48% hydrobromic acid is refluxed for 19 hours with rapid stirring. The hot solution is cautiously poured into a mixture of 140 ml. of cold concentrated aqueous ammonia and ice. After one-half an hour, the alkaline mixture is filtered and the solid dissolved in methanol and clarified with carbon. The methanol solution is then concentrated to about one-third its original volume and the solid collected and dried to yield 6-(p-chlorophenyl) - 1,2,3,4,5,6 - hexahydro - 3 - methyl - 2,6-methano-3-benzazocine-8-ol, M.P. 272–274° C.

Calc'd for $C_{19}H_{20}ClNO$ (313.82) (percent): C, 72.73; H, 6.45; Cl, 11.30. Found (percent): C, 72.40; H, 6.36; Cl, 11.40.

(e) 8 - acetoxy - 6 - (p - chlorophenyl) - 1,2,3,4,5,6-hexahydro - 3 - methyl - 2,6-methano-3-benzazocine.—A solution of 1.02 g. of 6-(p-chlorophenyl)-1,2,3,4,5,6-hexahydro-3-methyl-2,6-methano-3-benzazocine-8-ol in 7.00 ml. of acetic anhydride is heated for one hour at 100° C., poured into 30 ml. of cold water and rendered basic by the addition of 50% aqueous potassium hydroxide solution. The mixture is quickly extracted with ether, dried and concentrated. The residue is crystallized from isopropyl ether-petroleum ether (2:1) to yield 8-acetoxy-6-(p - chlorophenyl) - 1,2,3,4,5,6 - hexahydro-3-methyl-2,6-methano-3-benzazocine, M.P. 113–114° C. Further recrystallization raises the melting point to 115–117° C.

Calc'd for $C_{21}H_{22}ClNO_2$ (355.85) (percent): C, 70.88; H, 6.23; Cl, 9.96. Found (percent): C, 70.60; H, 6.10; Cl, 10.11, 9.91.

(f) 8 - acetoxy - 3 - cyano - 6 - (p-chlorophenyl)-1,2,3,4,5,6 - hexahydro - 2,6 - methano - 3 - benzazocine.—A solution of 3.00 g. of 8-acetoxy-6-(p-chlorophenyl)-1,2,3,4,5,6 - hexahydro - 3 - methyl - 2,6-methano - 3 - benzazocine in 80 ml. of chloroform is added over a one hour interval to a solution of 1.07 g. of cyanogen bromide in 40 ml. of chloroform. The solution is then refluxed for three hours and evaporated to dryness in vacuo. Trituration of the residue with 25 ml. of ethanol yields 8-acetoxy - 3 - cyano - 6 - (p - chlorophenyl)-1,2,3,4,5,6-hexahydro-2,6-methano-3-benzazocine, M.P. 168–170° C. The melting point remains unchanged upon recrystallization from ethanol.

Calc'd for $C_{21}H_{19}ClN_2O_2$ (percent): C, 68.76; H, 5.22; N, 7.63; Cl, 9.67. Found (percent): C, 68.64; H, 5.27; N, 7.82; Cl, 9.56.

3 - cyano - 6 - (p - chlorophenyl) - 1,2,3,4,5,6-hexahydro - 2,6 - methano - 3-benzazocine-8-ol is obtained from 8 - acetoxy - 3 - cyano - 6 - (p-chlorophenyl)-1,2,3,4,5,6-hexahydro-2,6-methano-3-benzazocine via the procedure of Example 2.

EXAMPLE 5

3-cyano-6-(3′,4′-dimethoxyphenyl)-1,2,3,4,5,6-hexahydro-8-methoxy-2,6-methano-3-benzazocine A solution of 76.5 g. (0.675 mole) of N-methyl-4-piperidone in 100 ml. of anhydrous ether is slowly added with stirring to a cooled solution of 183 g. (0.76 mole) of 3,4-dimethoxyphenyl magnesium bromide in 1 l. of anhydrous ether. Upon completion of the addition, the mixture is stirred for two hours at room temperature and then cooled in an ice bath. The unreacted Grignard reagent is decomposed by the careful addition of water after which is added 2.5 moles of hydrochloric acid diluted to 10% with water. The mixture is shaken and the aqueous layer then separated and rendered alkaline by the addition of aqueous ammonia. The aqueous mixture is extracted with chloroform and the chloroform extracts evaporated to a residue. This residue is dissolved in concentrated hydrochloric acid and the resulting solution then refluxed for two hours with stirring. The solution is cooled and poured into an ice cold aqueous excess of sodium hydroxide. This mixture is extracted with chloroform and the chloroform extracts then dried over sodium sulfate and evaporated. The residue is distilled in vacuo to yield the intermediate product 1-methyl-4-(3,4-dimethoxyphenyl)-1,2,5,6-tetrahydropyridine.

By substituting a molar equivalent amount of 1-methyl-4-(3,4 - dimethoxyphenyl) - 1,2,5,6 - tetrahydropyridine for 1-methyl-4-phenyl - 1,2,5,6 - tetrahydropyridine in the procedure of Example 1, parts (b) and (c) there is obtained the intermediate 1-methyl-2-(4-methoxybenzyl)-4-(3,4-dimethoxyphenyl) - 1,2,5,6 - tetrahydropyridine.

This compound as the hydrochloride salt is cyclized with aluminum tribromide according to the alternative procedure of Example 3 to yield 6-(3,4 - dimethoxyphenyl)-1,2,3,4,5,6 - hexahydro-8-methoxy - 3-methyl-2,6-methano-3-benzazocine which is treated with cyanogen bromide as described in part (b) of Example 3 to yield 3-cyano-6-(3,4 - dimethoxyphenyl) - 1,2,3,4,5,6-hexahydro-8-methoxy-2,6-methano-3-benzazocine.

EXAMPLE 6

8-acetoxy-3-cyano-1,2,3,4,5,6-hexahydro-6-($\beta$-methoxyethyl)-2,6-methano-3-benzazocine (a) 1,2,3,4,5,6 - hexahydro - 6 - ($\beta$-methoxyethyl)3-methyl-2,6-methano-3-benzazocine.—Methyl iodide (313 g., 137 ml.) is added dropwise with a stirring to a solution of 274 g. of 4-($\beta$-methoxyethyl)-pyridine in 400 ml. of acetate and 200 ml. of benzene at such a rate so as to maintain reflux. The stirring is continued for three hours while the reaction mixture is allowed to cool to room temperature. After refrigeration overnight the product is collected and dried to yield 4-($\beta$-methoxyethyl)-pyridine methiodide, M.P. 74–78° C.

A solution of 223 g. (0.08 mole) of 4-($\beta$-methoxyethyl)-pyridine methiodide in 320 ml. of water and 320 ml. of methanol is added dropwise with stirring to a solution of 50 g. (1.3 mole) of sodium borohydride in 240 ml. of water at such a rate so that the temperature is maintained at 50–60° C. (two hours required). Additional solid sodium borohydride (44 g.) is then added and stirring at room temperature is continued for 15 hours. At the end of this time, the solution is filtered and concentrated in vacuo to about one-third its original volume. The solution is then extracted with ether several times. These extracts are washed with saturated aqueous sodium sulfate, dried over sodium sulfate, evaporated and the residue distilled to yield 1 methyl-4-($\beta$-methoxyethyl)-1,2,5,6-tetrahydropyridine, B.P. 90–92° C./12 mm.

A 10% mole excess of benzyl chloride is added to a solution of 7.8 g. of 1-methyl-4-($\beta$-methoxyethyl)-1,2,5,6-tetrahydropyridine in 30 ml. of acetone. After standing at room temperature the product crystallizes and is collected to yield 1 - benzyl-1-methyl-4-($\beta$-methoxyethyl)-1,2,5,6-tetrahydropyridinium chloride, M.P. 128–132° C. Recrystallization from acetone raises the melting point to 134.5–137.5° C. The compound is very hygroscopic.

A 2.0 molar solution of phenyl lithium is ether (72.5 ml., 0.143 mole) is added dropwise to a stirred suspension of dry (60–80°/5 mm., one hour) 1 benzyl-1-methyl-4 - ($\beta$-methoxyethyl) - 1,2,5,6 - tetrahydropyridinium chloride (35.8 g., 0.127 mole) in 225 ml. of anhydrous ether at such a rate so as to maintain a gentle reflux. Refluxing is continued for two hours and then the reaction mixture is cooled and rendered acidic with about 100 ml. of 2 N hydrochloric acid. The aqueous layer is separated and rendered basic with conc. ammonium hydroxide, again with ice cooling. The product is extracted into ether, and the extract dried over sodium sulfate and evaporated. The residue is distilled to yield 2-benzyl-4-($\beta$-methoxyethyl)-1-methyl - 1,2,5,6 - tetrahydropyridine, B.P. 128–135° C./5 mm.

A solution of the soluble portion of 12.0 g. of aluminum tribromine in 20 ml. of carbon disulfied is added over a ten minute interval to a solution of 3.0 g. of freshly distilled 2 - benzyl-4-($\beta$-methoxyethyl)-1-methyl-1,2,5,6-tetrahydropyridine in 20 ml. of carbon disulfide with stirring and cooling in ice. After five minutes the cooling bath is removed and the mixture heated at reflux for 30 minutes. The mixture is then cooled, the solution decanted and the residue washed with carbon disulfide. The viscous residue is then poured over ice and 20 ml. of conc. aqueous ammonia are added. Chloroform is added and the mixture stirred and heated to melt the ice and warm the mixture. The solids are removed by filtration and washed well with chloroform. The chloroform layer is separated, dried over sodium sulfate and evaporated. The residual oil is distilled at 130° C./.05 mm. to yield 1,2,3,4,5,6 - hexahydro-6-($\beta$-methoxyethyl)-3-methyl-2,6-methano-3-benzazocine. The hydrochloride melts at 163–165° C. after two recrystallizations from acetone.

(b) 1,2,3,4,5,6 - hexahydro - 6-($\beta$-methoxyethyl)-3-methyl - 2,6 - methano-3-benzazocine-8-ol.—To a solution of 5.33 g. (0.022 mole) of 1,2,3,4,5,6-hexahydro-6-($\beta$-methoxyethyl)-3-methyl-2,6 - methano-3-benzazocine in 20 ml. of glacial acetic acid, chilled to −10° C., is added a mixture of 20 ml. fuming nitric acid (19%) and 15 ml. of glacial acetic acid, also cooled to −10° C. The reaction mixture is stirred vigorously so as to maintain the temperature at below 5° C. The solution is then allowed to stand at room temperature for 63 hours and then poured into 400 ml. of water. The acidic aqueous solution is extracted with 25 ml. of methylene chloride. The extracted solution is rendered basic with aqueous sodium hydroxide solution and again extracted three times with methylene chloride. These organic extracts are combined, dried over magnesium sulfate and concentrated, to yield an oil which upon treatment with picric acid in ethanol, produces a yellow picrate, M.P. 212.5° C. This picrate is dissolved in methylene chloride and the resulting solution shaken with excess 5% aqueous lithium hydroxide solution. The organic solution is separated, dried over magnesium sulfate and concentrated to give the light tan oil, 1.96 g. of which are then dissolved in a mixture of 80 ml. of 95% ethanol and 10 ml. of hydrazine hydrate. To the solution is added a small amount of freshly prepared Raney nickel. The solution is heated on the steam bath for 30 minutes. The solution is then filtered and concentrated. This residue is dissolved in 50 ml. of 3 N sulfuric acid and the solution cooled to 0° C. One-half gram of sodium nitrite is gradually added. The temperature is maintained at 0° C. for 30 minutes and the mixture then poured into a warm mixture of 40 ml. of sulfuric acid and 40 ml. of water. This solution is heated for 30 minutes on a steam bath, chilled and neutralized with concentrated ammonium hydroxide solution. The mixture is extracted three times with methylene chloride and the combined extracts then dried over magnesium sulfate and concentrated. The residue is dissolved in acetone and the solution chromatographed on a short column of alumina. The solvent is removed and the residual tan solid recrystallized from toluene-petroleum ether to yield 1,2,3,4,5,6 - hexahydro - 6 - ($\beta$-methoxyethyl)-3-methyl-2,6 - methano - 3-benzazocine-8-ol, M.P. 155–159° C. (dec.).

(c) 8-acetoxy-1,2,3,4,5,6-hexahydro - 6 - ($\beta$-methoxyethyl)-3-methyl-2,6-methano-3-benzazocine.—A solution of 1.0 g. of 1,2,3,4,5,6-hexahydro-6-($\beta$-methoxyethyl)-3-methyl-2,6-methano-3-benzazocine-8-ol in 7.0 ml. of acetic anhydride is heated for one hour at 100° C., cooled, poured into 30 ml. of cold water and rendered alkaline by the addition of cold 50% aqueous potassium hydroxide solution. The mixture is then quickly extracted with ether and these extracts, dried over anhydrous sodium sulfate and evaporated to yield 8-acetoxy-1,2,3,4,5,6-hexahydro-6-($\beta$-methoxyethyl)-3-methyl-2,6-methano - 3 - benzazocine.

In like manner by employing the appropriate intermediate there is prepared $\alpha$-8-acetoxy-3,6-dimethyl-11-ethyl - 1,2,3,4,5,6-hexahydro-2,6-methano-3-benzazocine; $\beta$-8-acetoxy-3,6-dimethyl-11-ethyl-1,2,3,4,5,6 - hexahydro-2,6 - methano - 3 - benzazocine and 8-acetoxy-6-isopropyl-1,2,3,4,5,6-hexahydro-3-methyl-2,6-methano - 3 - benzazocine.

(d) 8-acetoxy - 3 - cyano-1,2,3,4,5,6-hexahydro-6-($\beta$-methoxyethyl)-2,6-methano-3-benzazocine.—8 - acetoxy-1,2,3,4,5,6-hexahydro-6-($\beta$-methoxyethyl)-3-methyl - 2,6-methano-3-benzazocine is treated with cyanogen bromide according to the procedure of part (f) of Example 1 to obtain 8-acetoxy-3-cyano-1,2,3,4,5,6-hexahydro-6-($\beta$-methoxyethyl)-2,6-methano-3-benzazocine.

3-cyano-1,2,3,4,5,6-hexahydro - 6 - (β-methoxyethyl)-2,6-methano-3-benzazocine-8-ol is obtained from this compound via the hydrolysis procedure of Example 2.

In a similar fashion, α-8-acetoxy-3,6-dimethyl-11-ethyl-1,2,3,4,5,6-hexahydro-2,6 - methano - 3 - benzazocine; β-8-acetoxy-3,6-dimethyl-11-ethyl - 1,2,3,4,5,6-hexahydro-2,6-methano - 3 - benzazocine and 8-acetoxy-6-isopropyl - 1,2,3,4,5,6-hexahydro - 3 - methyl-2,6-methano-3-benzazocine are respectively converted to α-8-acetoxy-3-cyano-11-ethyl - 1,2,3,4,5,6 - hexahydro-6-methyl - 2,6-methano-3-benzazocine; β-8-acetoxy - 3 - cyano-11-ethyl-1,2,3,4,5,6-hexahydro - 6 - methyl-2,6-methano-3-benzazocine; and 8-acetoxy-3-cyano-1,2,3,4,5,6-hexahydro - 6 - isopropyl-2,6-methano-3-benzazocine. The corresponding free 8-hydroxy compounds are obtained via hydrolysis according to the procedure of Example 2.

The α and β forms of the above requisite intermediates 3,6-dimethyl-11-ethyl - 1,2,3,4,5,6 - hexahydro-2,6-methano-3-benzazocine-8-ol are known. The requisite 1,2,3,4,5,6 - hexahydro-6-isopropyl-3-methyl-2,6-methano - 3 - benzazocine-8-ol is prepared as follows:

To a solution of 24.20 g. (0.20 mole) of distilled 4-isopropylpyridine in 50 ml. of acetone are added 15 ml. of methyliodide. The reaction is exothermic and the methiodide crystallizes within one hour. The mixture is stirred a total of two hours, filtered and washed with cold acetone. The product is recrystallized from acetone to yield 4-isopropylpyridine methiodide, M.P. 123–130° C., which should be stored under nitrogen in a brown bottle.

p-Methoxybenzyl magnesium chloride is prepared from 32.9 g. (0.211 mole) of p-methoxybenzylchloride and 0.5 mole each of magnesium powder and magnesium turnings in 225 ml. of anhydrous ether.

To a suspension of 44.10 g. of 4-isopropyl-pyridine methiodide in 150 ml. ether is added the filtered (through glass wool) p-methoxybenzyl magnesium chloride. The mixture is refluxed for two hours, after which it is poured with vigorous stirring into ice water containing 22 g. of ammonium chloride. After addition of a little aqueous ammonia, the ethereal layer is extracted three times with 100 ml. portions of 2 N hydrochloric acid. These acid extracts are rendered alkaline by the addition of cold aqueous ammonia and the liberated base dried in ether. Evaporation of the ether yields crude 1-methyl-2-(p-methoxybenzyl)-4-isopropyl - 1,2 - dihydropyridine. This material is dissolved in 110 ml. of methanol and 50 ml. of 1 N sodium hydroxide and then added to a solution of 21 ml. of 1 N sodium hydroxide and 4.75 g. (.125 mole) of sodium borohydride. The reaction mixture is maintained at 65±5° C. for one hour, then concentrated in vacuo to remove methanol. Two hundred milliliters of water are added and the aqueous phase is extracted three times with ethel (3× 75 ml.). Evaporation of the dried ethereal extracts yields the impure 4-isopropyl-1-methyl-2-(p-methoxybenzyl) - 1,2,5,6 - tetrahydropyridine which is further purified by repeated fractional distillation, B.P. 101–102° C./.06 mm.

A mixture of 9.95 g. (38.2 m.mole) of 4-isopropyl-1-methyl-2-(p - methoxybenzyl)-1,2,5,6-tetrahydropyridine and 100 ml. of 48% hydrobromic acid is heated at 150° C. for 24 hours. The gummy mixture is then poured into ice cooled water and rendered basic by the addition of concentrated ammonium hydroxide solution. The solid formed is collected, washed with water and dried in a vacuum desiccator at room temperature to constant weight. This material is chromatographed on a silica gel column using 80:15:5 n-butanol:conc. ammonium hydroxide:benzene as eluant. The material, melting at 235.5–237.5° C., is then recrystallized twice from ethyl acetate with clarification to yield 1,2,3,4,5,6-hexahydro-6-isopropyl-3-methyl-2,6-methano - 3 - benzazocine-8-ol, M.P. 240.0–242.5° C.

EXAMPLE 7

8-acetoxy-3-cyano-1,2,3,4,5,6-hexahydro-11-methyl-6-phenyl-2,6-methano-3-benzazocine (a) 8-acetoxy - 3,11 - dimethyl-1,2,3,4,5,6-hexahydro-6-phenyl-2,6-methano-3-benzazocine.—By employing a molar equivalent amount of 1,3-dimethyl-4-phenyl-1,2,5,6-tetrahydropyridine in place of 1-methyl-4-phenyl-1,2,5,6-tetrahydropyridine in the procedure of Example 1, parts (a) to (e), there is obtained predominantly the cis isomer of 8-acetoxy - 3,11 - dimethyl-1,2,3,4,5,6-hexahydro-2,6-methano-3-benzazocine. The cis isomer is separated from the minor component of the trans isomer by fractional crystallization of the hydrochloride salts from methanol-acetone with the trans isomer being recovered from the mother liquors.

The trans isomer is prepared in larger proportions by cyclizing the hydrochloride salt of 1,3-dimethyl-2-(4-methoxybenzyl)-4-phenyl - 1,2,5,6 - tetrahydropyridine with aluminum tribromide according to the alternative procedure of Example 3 to yield 3,11-dimethyl-1,2,3,4,5,6-hexahydro-8-methoxy-6-phenyl-2,6-methano - 3 - benzazocine which may be demethylated with hydrogen bromide and esterified as herein described to yield the corresponding 8-acetoxy compound.

(b) 8 - acetoxy-3-cyano-1,2,3,4,5,6 - hexahydro - 11-methyl-6-phenyl - 2,6-methano-3-benzazocine.—By separately substituting the cis and trans form of 8-acetoxy-3,11-dimethyl-1,2,3,4,5,6-hexahydro - 6 - phenyl - 2,6-methano-3-benzazocine in the procedure of part (f) of Example 1, there are respectively obtained the cis and trans forms of 8-acetoxy-3-cyano-1,2,3,4,5,6-hexahydro-11-methyl-6-phenyl-2,6-methano-3-benzazocine. Likewise from the free phenolic compounds, there are respectively obtained the cis and trans isomers of 3-cyano-1,2,3,4,5,6-hexahydro-11-methyl-6-phenyl - 2,6-methano-3 - benzazocine-8-ol.

EXAMPLE 8

Resolution of 3-cyano-1,2,3,4,5,6-hexahydro-6-phenyl-2,6-methano-3-benzazocine-8-ol 1,2,3,4,5,6-hexahydro-3-methyl-6-phenyl-2,6 - methano-3-benzazocine-8-ol (3.96) g.) and 4.4 g. of d-camphorsulfonic acid are suspended in boiling acetone and sufficient methanol is added to effect dissolution. The solution is then allowed to cool and the salt which forms is collected by filtration, dried and recrystallized from methanol acetone (M.P. 241–247° C., $[\alpha]_D^{25} = +120°$, c.=0.5, methanol). The salt is then suspended in excess 10% aqueous ammonium hydroxide and the solid which forms is collected and dried to yield the dextrorotatory base, M.P. 254–259°, $[\alpha]_D^{25} = -173°$, c.=0.52, methanol.

The levorotatory base is recovered from the mother liquor of the original solution by concentration and purified via formation of the salt with d-tartaric acid.

Each of the two isomers are subjected to the procedure of Example 1, parts (e) and (f), to yield the dextrorotatory and levorotatory forms of 3-cyano-1,2,3,4,5,6-hexahydro-6-phenyl-2,6-methano-3-benzazocine-8-ol.

EXAMPLE 9

1,2,3,4,5,6-hexahydro-6-phenyl-2,6-methano-3-benzazocine-8-ol

To a suspension of 5.60 g. of lithium aluminum hydride in 100 ml. of dry tetrahydrofuran under anhydrous conditions are added 5.00 g. of 8-acetoxy-3-cyano-1,2,3,4,5,6-hexahydro-6-phenyl - 2,6 - methano-3-benzazocine dissolved with the aid of heat in 100 ml. of dry tetrahydrofuran. The mixture is refluxed for 17 hours and then decomposed by the addition of 29 ml. of saturated sodium chloride solution. The resulting mixture is next refluxed one hour and filtered. The filtrate is concentrated in vacuo and the residue is then recrystallized from isopropanol to yield 1,2,3,4,5,6-hexahydro-6-phenyl-2,6-methano-3-benzazocine-8-ol, M.P. 239–241° C.

EXAMPLE 10

3-carbamyl-6-phenyl-1,2,3,4,5,6-hexahydro-2,6-methano-3-benzazocine-8-ol

To a mixture of 9.0 g. of 8-acetoxy-3-cyano-1,2,3,4,5,6-hexahydro-6-phenyl-2,6-methano-3-benzazocine, 9.7 ml. of 30% hydrogen peroxide and 30 ml. of ethanol are added slowly 5.6 ml. of 6 N aqueous sodium hydroxide solution with stirring and external cooling, maintaining the temperature at 35–46°. When addition is complete, the cooling bath is removed and the mixture is stirred at 50–60° for three and one-half hours. The mixture is then cooled and the solid is collected by filtration and washed with water and ethanol to yield 3-carbamyl-6-phenyl-1,2,3,4,5,6-hexahydro-2,6-methano - 3 - benzazocine-8-ol. The product after several recrystallizations from methanol melts at 292–294° C.

Calc'd for $C_{19}H_{20}N_2O_2$ (308.37) (percent): C, 74.00; H, 6.54; N, 909. Found (percent): C, 73.65; H, 6.30; N, 8.97.

What is claimed is:

1. A compound of the formula:

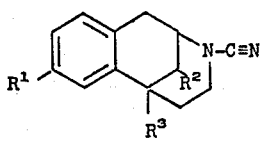

wherein
$R^1$ is hydrogen, hydroxy, (lower) alkoxy or (lower) alkanoyloxy,
$R^2$ is hydrogen or (lower) alkyl and
$R^3$ is hydrogen, (lower) alkyl, 2-methoxyethyl or

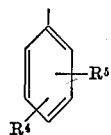

in which each of $R^4$ and $R^5$ is hydrogen, halogen, (lower) alkyl, (lower) alkoxy, (lower alkanoyloxy, hydroxy or trifluoromethyl.

2. A compound according to claim 1 wherein $R^1$ is hydroxy, methoxy or acetoxy, $R^2$ is hydrogen or methyl and $R^3$ is β-methoxyethyl.

3. The compound according to claim 2 wherein $R^1$ is hydroxy and $R^2$ is hydrogen.

4. The compound according to claim 2 wherein $R^1$ is acetoxy and $R^2$ is hydrogen.

5. A compound according to claim 1 wherein $R^1$ is hydroxy, methoxy or acetoxy, $R^2$ is hydrogen or methyl and $R^3$ is

wherein $R^4$ and $R^5$ are as therein defined.

6. A compound according to claim 5 wherein $R^3$ is phenyl or chlorophenyl.

7. The compound according to claim 6 wherein the compound is 8-acetoxy-3-cyano-1,2,3,4,5,6-hexahydro-6-phenyl-2,6-methano-3-benzazocine.

8. The compound according to claim 6 wherein the compound is 3-cyano-1,2,3,4,5,6-hexahydro-6-phenyl-2,6-methano-3-benzazocine-8-ol.

9. The compound according to claim 6 wherein the compound is 8-acetoxy - 3 - cyano-6-(p-chlorophenyl)-1,2,3,4,5,6-hexahydro-2,6-methano-3-benzazocine.

10. The compound according to claim 6 wherein the compound is 3 - cyano - 6-(p-chlorophenyl)-1,2,3,4,5,6-hexahydro-2,6-methano-3-benzazocine-8-ol.

11. The compound according to claim 6 wherein the compound is cis 8-acetoxy-3-cyano-1,2,3,4,5,6-hexahydro-11-methyl-6-phenyl-2,6-methano-3-benzazocine.

12. The compound according to claim 6 wherein the compound is trans 8-acetoxy - 3-cyano-1,2,3,4,5,6-hexahydro-11-methyl-6-phenyl-2,6-methano-3-benzazocine.

13. The compound according to claim 6 wherein the compound is cis 3-cyano-1,2,3,4,5,6-hexahydro-11-methyl-6-phenyl-2,6-methano-3-benzazocine-8-ol.

14. The compound according to claim 6 wherein the compound is trans 3 - cyano-1,2,3,4,5,6-hexahydro-11-methyl-6-phenyl-2,6-methano-3-benzazocine-8-ol.

15. The compound according to claim 6 wherein the compound is 8-methoxy - 3 - cyano-6-phenyl-1,2,3,4,5,6-hexahydro-2,6-methano-3-benzazocine.

16. The compound according to claim 6 wherein the compound is 8-methoxy - 3 - cyano-6-(3,4-dimethoxyphenyl)-1,2,3,4,5,6-hexahydro-2,6-methano - 3 - benzazocine.

17. The compound according to claim 1 wherein the compound is 3-cyano-6-isopropyl-1,2,3,4,5,6 - hexahydro-2,6-methano-3-benzazocine-8-ol.

References Cited

UNITED STATES PATENTS 3,372,165  3/1968  Archer _____ 260—294.7

OTHER REFERENCES

Jacobson et al., J. Med. Chem. 8, 563–6 (1965).

HENRY R. JILES, Primary Examiner
G. T. TODD, Assistant Examiner

U.S. Cl. X.R.
260—293, 294.7; 424—232, 253, 267